(12) United States Patent
Fraser

(10) Patent No.: US 10,119,459 B2
(45) Date of Patent: Nov. 6, 2018

(54) OIL SUPPLY CONDUIT THROUGH STATOR LAMINATION STACK FOR ELECTRIFIED TURBOCHARGER

(71) Applicant: BorgWarner Inc., Auburn Hills, MI (US)

(72) Inventor: Brock Fraser, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 295 days.

(21) Appl. No.: 14/887,804

(22) Filed: Oct. 20, 2015

(65) Prior Publication Data

US 2017/0107897 A1    Apr. 20, 2017

(51) Int. Cl.

| | | |
|---|---|---|
| H02K 7/08 | (2006.01) |
| F02B 39/14 | (2006.01) |
| F02B 39/10 | (2006.01) |
| F01D 25/18 | (2006.01) |
| F01D 5/02 | (2006.01) |
| F01D 25/16 | (2006.01) |
| F04D 29/28 | (2006.01) |
| F04D 25/06 | (2006.01) |
| F01D 25/24 | (2006.01) |
| H02K 1/08 | (2006.01) |
| H02K 1/20 | (2006.01) |

(52) U.S. Cl.
CPC ............... *F02B 39/14* (2013.01); *F01D 5/02* (2013.01); *F01D 25/166* (2013.01); *F01D 25/18* (2013.01); *F01D 25/24* (2013.01); *F02B 39/10* (2013.01); *F04D 25/06* (2013.01); *F04D 29/284* (2013.01); *H02K 1/08* (2013.01); *H02K 1/20* (2013.01); *H02K 7/08* (2013.01); *F05D 2220/40* (2013.01); *F05D 2260/98* (2013.01)

(58) Field of Classification Search
CPC .................................. H02K 1/20; H02K 7/08
See application file for complete search history.

(56) References Cited

U.S. PATENT DOCUMENTS 3,663,848 A * 5/1972 Lehoczky ............ H02K 5/1672
                                                310/178
4,514,652 A * 4/1985 Olson .................... H02K 5/128
                                                310/113

(Continued)

FOREIGN PATENT DOCUMENTS

JP      2008095650 A    4/2008

OTHER PUBLICATIONS

Extended European Search Report dated Feb. 16, 2017 ;Application No. 16192911.2-1616 ; Applicant: BorgWarner Inc.;6 pages.

(Continued)

*Primary Examiner* — Dang Le
(74) *Attorney, Agent, or Firm* — BrooksGroup

(57) ABSTRACT

A number of variations may include a product comprising: an electrified turbocharger comprising: an electric motor surrounding a portion of a shaft constructed and arranged to selectively drive the shaft, wherein the electric motor further comprises a stator comprising a lamination stack; a housing surrounding the electric motor, wherein the housing includes a plurality of channels constructed and arranged to lubricate a first bearing; and wherein the lamination stack is constructed and arranged to include at least one conduit to pass oil through the electric motor to a second bearing.

18 Claims, 3 Drawing Sheets

(56) References Cited

U.S. PATENT DOCUMENTS

| | | | |
|---|---|---|---|
| 5,605,045 A * | 2/1997 | Halimi | F01D 5/085 |
| | | | 310/52 |
| 6,361,271 B1 | 3/2002 | Bosley | |
| 7,119,461 B2 | 10/2006 | Dooley | |
| 7,946,118 B2 | 5/2011 | Hippen et al. | |
| 8,237,316 B2 | 8/2012 | Bischof et al. | |
| 8,968,138 B2 | 3/2015 | Kalmbach et al. | |
| 2003/0075996 A1* | 4/2003 | Yoshida | H02K 1/20 |
| | | | 310/58 |
| 2006/0103256 A1 | 5/2006 | Welke | |
| 2006/0225419 A1 | 10/2006 | Prusinski et al. | |
| 2010/0175377 A1 | 7/2010 | Hippen et al. | |
| 2010/0284824 A1 | 11/2010 | Hippen et al. | |
| 2012/0267971 A1 | 10/2012 | Husum et al. | |
| 2013/0119830 A1 | 5/2013 | Hautz et al. | |
| 2013/0239569 A1 | 9/2013 | Carter et al. | |
| 2014/0056726 A1 | 2/2014 | Garrard et al. | |
| 2014/0252893 A1 | 9/2014 | Veeh et al. | |
| 2015/0207386 A1 | 7/2015 | Garrard et al. | |

OTHER PUBLICATIONS

European Office Action dated Mar. 6, 2018; Application No. 16 192 911.2-1004; Applicant: BorgWarner Inc.; 3 pages.

* cited by examiner

OIL SUPPLY CONDUIT THROUGH STATOR LAMINATION STACK FOR ELECTRIFIED TURBOCHARGER

TECHNICAL FIELD

The field to which the disclosure generally relates to includes turbochargers.

BACKGROUND

A turbocharger may include an electric motor.

SUMMARY OF ILLUSTRATIVE VARIATIONS

A number of variations may include a product including: an electrified turbocharger including: an electric motor surrounding a portion of a shaft constructed and arranged to selectively drive the shaft, wherein the electric motor further includes a stator comprising a lamination stack; a housing surrounding the electric motor, wherein the housing includes a plurality of channels constructed and arranged to lubricate a first bearing; and wherein the lamination stack is constructed and arranged to include at least one conduit to pass oil through the electric motor to a second bearing.

A number of variations may include a method for a bearing lubrication system for an electric turbocharger comprising: providing a stator with a first oil conduit and a second oil conduit extending through the stator; feeding oil to one end of a turbocharger housing so that oil is supplied to a first bearing and through the first oil conduit and the second oil conduit so that oil is supplied to a second bearing.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
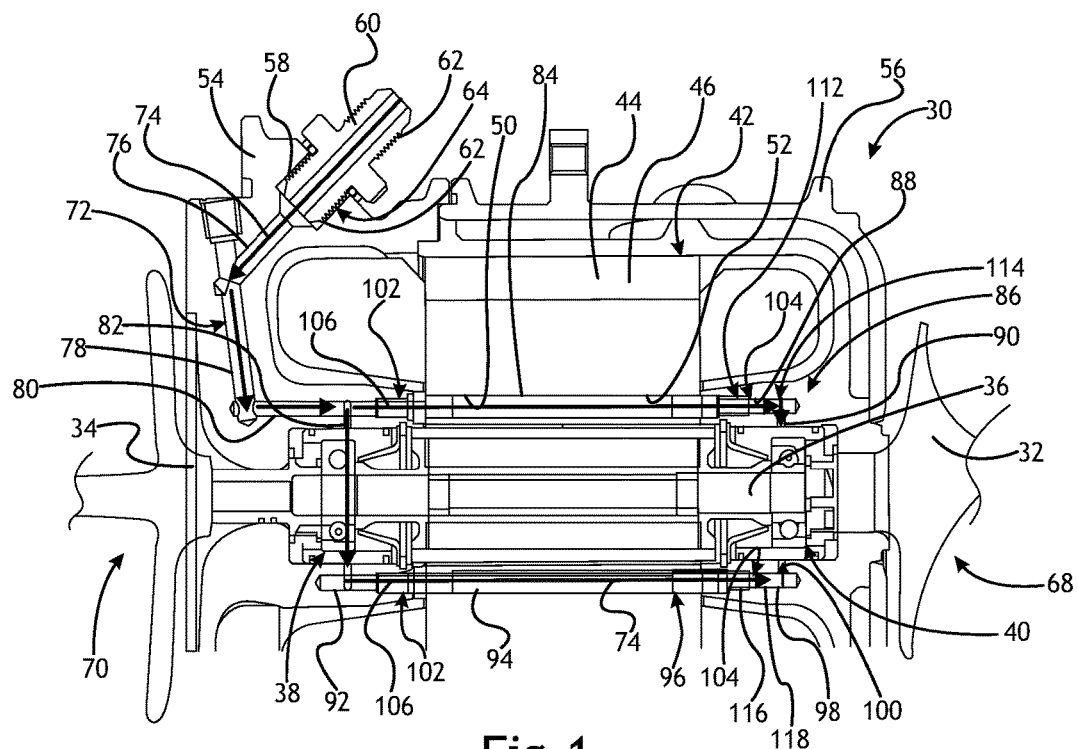
FIG. 1 illustrates a section view of a bearing lubrication system in an electric turbocharger according to a number of variations.
Figure 2:
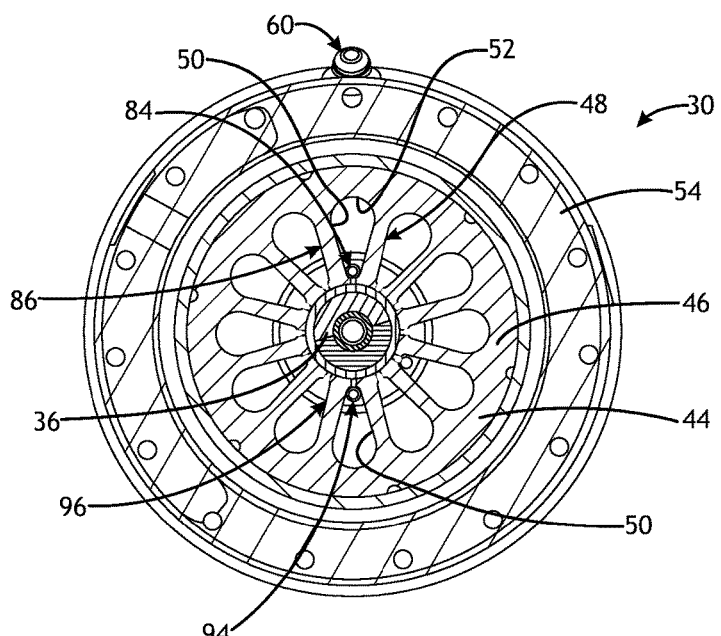
FIG. 2 illustrates an end view of a bearing lubrication system in an electric turbocharger according to a number of variations.

Referring to FIG. 1, in a number of variations, an electrified turbocharger 30 may comprise a turbine wheel 32 which may be operatively connected to a compressor wheel 34 through a shaft 36. The turbine wheel 32 may receive thermodynamic power from exhaust gas from the system and may drive the shaft 36 which may then drive the compressor wheel 34. The shaft 36 may be supported for rotation by a first bearing 38 and a second bearing 40. An electric motor 42 may surround a portion of the shaft 36 and may be used to selectively drive the shaft 36 through the use of an electronic control unit (not illustrated). In a number of variations, the electric motor 42 may comprise a stator 44 which may comprise a lamination stack 46. The lamination stack 46 may comprise a plurality of teeth 48 surrounding the inner perimeter 52 of the lamination stack 46, a variation of which is illustrated in FIG. 2. In a number of variations, a housing 54, 56 may surround the electric motor 42 and the bearings 38, 40. In a number of variations, oil 74 may be provided to the first and second bearings 38, 40 through a bearing lubrication system 72 in order to ensure proper rotation of the shaft 36.

Referring again to FIG. 1, in a number of variations, a bearing lubrication system 72 may utilize a lamination stack 46 of a stator 44 which may be constructed and arranged to include one or more conduits 84, 94 which may be used to pass oil through the electric motor 42 to the first and the second bearings 38, 40. This may allow oil 74 to be supplied through one end of the turbocharger 30 and fed to the first bearing 38 and the second bearing 40 without having a complex circuit of drilled oil channels in order to wrap around the outside of the stator 44. Feeding oil 74 through the electric motor 42 may also allow for reduced packing space as the complex drilled oil channels are no longer required on one end of the turbocharger 30 which may allow for simplified machining on one end of the housing 54, 56.

In a number of variations, the bearing lubrication system 72 may also utilize a housing 54, 56 which may comprise a first housing portion 54 and a second housing portion 56, a variation of which is illustrated in FIG. 1. The first housing portion 54 may include a threaded bore 58 defined by an inner threaded surface which may be constructed and arranged to accommodate an oil feed tube 60. The threaded bore 58 may be positioned at an angle in the first housing portion 54. In a number of variations, the oil feed tube 60 may be partially threaded 62 at the ends 64 of the oil feed tube 60 and may include a pilot feature which may ensure that the threads 62 are true before threading begins which may protect the threads 58, 62 from cross threading. The first housing portion 54 may be adjacent the turbine end 68 or the compressor end 70, a variation of which is illustrated in FIG. 1.

In a number of variations, a first oil channel 76 may extend from the threaded bore 58 in the first housing portion 54. In one variation, the first oil channel 76 may extend at the same angle as the threaded bore. The first oil channel 76 may be connected to a second oil channel 78 which may extend downward within the first housing portion 54. In one variation, the second oil channel 78 may extend at an angle inward toward the first bearing 38 and may be connected to a third oil channel 80. In a number of variations, the third oil channel 80 may extend horizontally from the second oil channel 78 toward the inner perimeter 52 of the stator 44. The third oil channel 80 may be connected to a fourth oil channel 82 as well as a first oil tube 84 which may extend through an opening 50 between the teeth 48 on a first end 86 of the stator 44, a variation of which is illustrated in FIG. 2. In a number of variations, the first oil tube 84 may be constructed and arranged to fit within the stator teeth opening 50 to ensure that the stator 44 is locked from rotation, a variation of which is also illustrated in FIG. 2. The fourth oil channel 82 may extend downward approximately perpendicular to the first bearing 38 and may provide oil 74 to the first bearing 38. The first oil tube 84 may extend through the stator 44 into a fifth oil channel 88 aligned with the first oil tube 84 in the second housing portion 56. The fifth oil channel 88 may include a first diameter 112 which may be greater than the diameter of the first oil tube 84 and a second diameter 114 which may be less than that of the first oil tube 84 so that the first oil tube 84 may bottom out when it extends a distance into the fifth oil channel 88. The fifth oil channel 88 may also include a vertical channel 90 which may extend downward to the second bearing 40 to feed oil 74 to the second bearing 40, a variation of which is illustrated in FIG. 1. The fourth oil channel 82 may also be connected to a sixth oil channel 92 which may be aligned with a second oil tube 94. The second oil tube 94 may extend through an opening 50 between the teeth 48 on a second end 96 of the stator 44, a variation of which is illustrated in FIG. 2. In a number of variations, the second oil tube 94 may be constructed and arranged to fit within the stator teeth 48 opening 50 to ensure that the stator 44 is locked from rotation, a variation of which is also illustrated in FIG. 2. The second oil tube 94 may extend through the stator 44 to a seventh oil channel 98 aligned with the second oil tube 94 in the second housing portion 56, a variation of which is illustrated in FIG. 1. The seventh oil channel 98 may include a first diameter 116 which may be greater than the diameter of the second oil tube 94 and a second diameter 118 which may be less than the diameter of the second oil tube 94 so that the second oil tube 94 may bottom out when it extends a distance into the seventh oil channel 98, a variation of which is illustrated in FIG. 1. The seventh oil channel 98 may also include a vertical channel 100 which may extend upward to the second bearing 40 to feed oil 74 to the second bearing 40 from the second oil tube 94.

Figure 3:
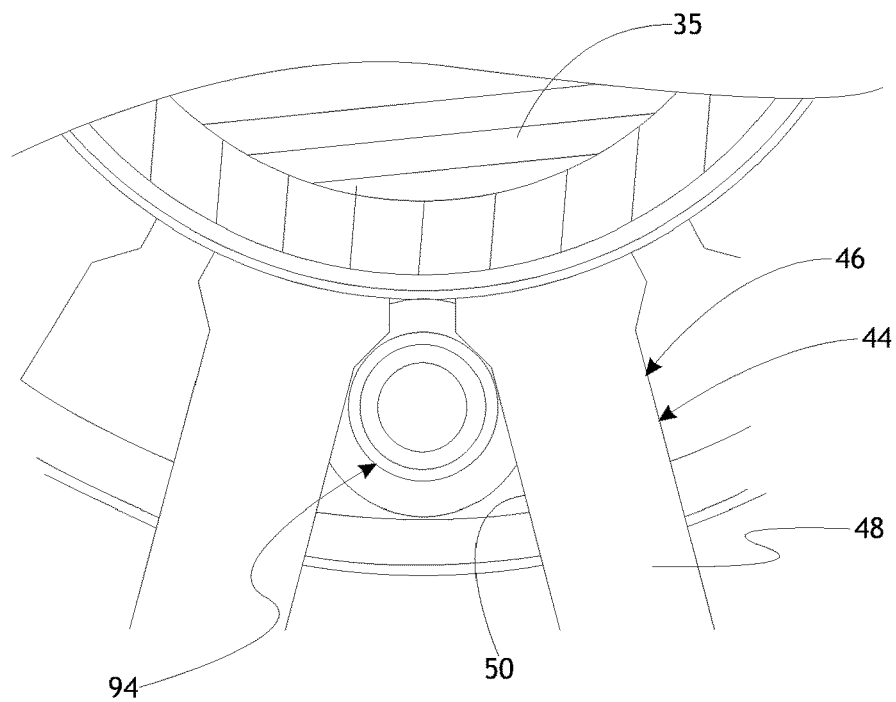
FIG. 3 illustrates a close-up end view of an oil tube according to a number of variations.

In one variation, the first oil tube 84 and the second oil tube 94 may be cylindrical, a variation of which is illustrated in FIG. 3, and may be of a length longer than the stator 44 so that the second end 104 of the tubes 84, 94 may bottom out into the second housing portion 56, as discussed above, and so that the first ends 102 may accommodate a nut 106, a variation of which is illustrated in FIG. 1. In a number of variations, the nut 106 may provide a preload for clamping the stator 44 in its proper location. The first housing portion 54 may then be slid over the nuts 106 which may form a seal for the bearing lubrication system 72 which may reduce or prevent oil from leaking from the first and second oil tubes 84, 94.

Figure 4:
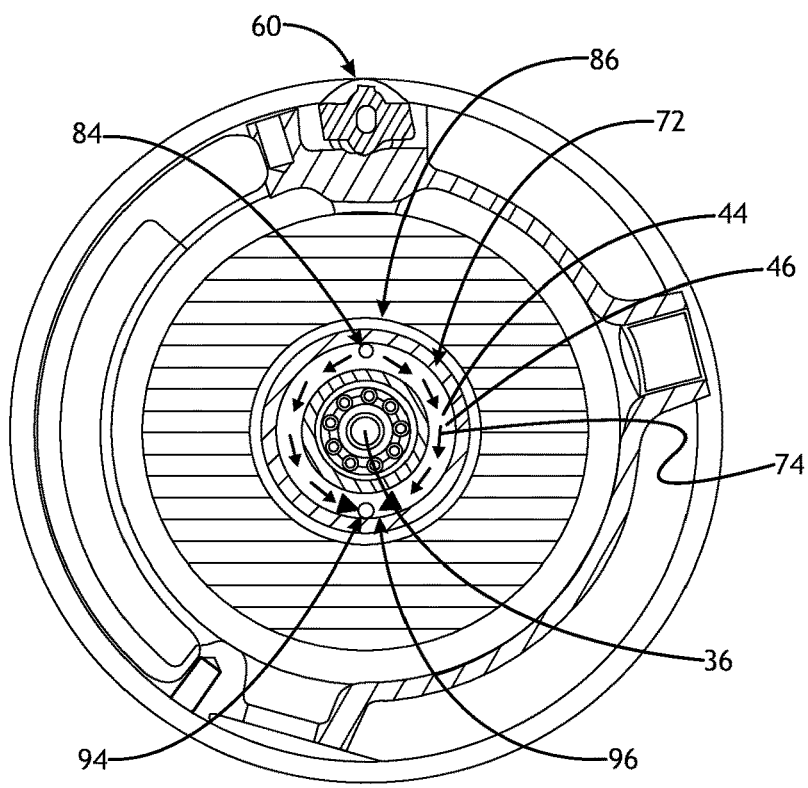
FIG. 4 illustrates a section end view of a bearing lubrication system in an electric turbocharger according to a number of variations.

In a number of variations, oil 74 may be fed through the threaded oil feed tube 60 into the oil channels 76, 78, 80, 82, 92 in the first housing portion 54 so that oil 74 may travel to the first bearing 38 while maintaining pressure through the bearing lubrication system 72. This may allow oil 74 to also be fed through the first and second oil tubes 84, 94 to the second bearing 40, variations of which are illustrated in FIGS. 1 and 4, and through the oil channels 88, 98 in the second housing portion 56.

Figure 5:
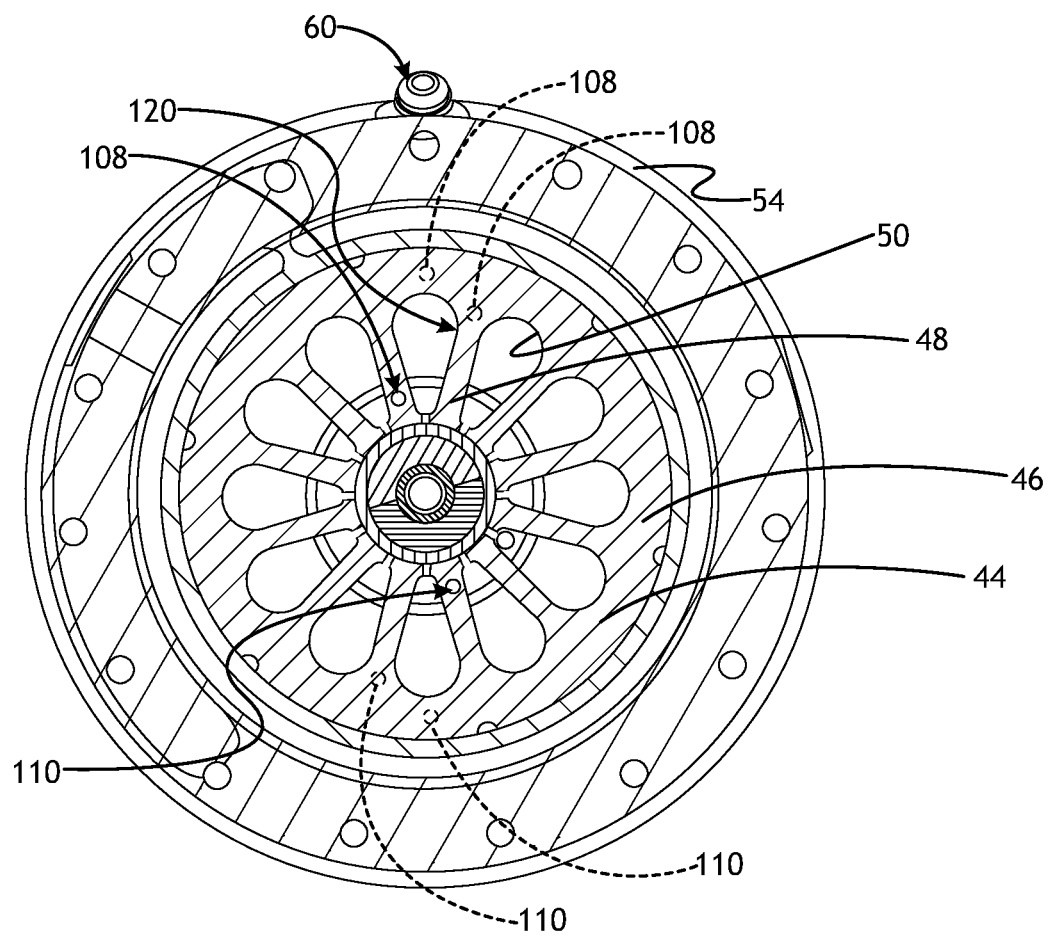
FIG. 5 illustrates an end view of a bearing lubrication system in an electric turbocharger according to a number of variations.

Referring to FIG. 5, in another variation, at least one conduit 108, 110 defined by an inner cylindrical surface may be formed through the stator 44 lamination stack 46 to feed oil 74 to the second bearing 40 in the same manner as illustrated above. In one variation, a first conduit 108 may extend through a first tooth 48 of the lamination stack 46 and a second conduit 110 may extend through a second tooth 48 of the lamination stack 46, opposite of the first tooth 48. It is noted that a conduit may be formed through any area of the lamination stack 46 depending on design parameters of the system including, but not limited to, adjacent an opening 50 between the lamination stack teeth 48 on opposing ends, a variation of which is illustrated in phantom in FIG. 5, or at an end portion 120 of a lamination stack tooth 48 on opposing ends, a variation of which is also illustrated in phantom in FIG. 5.

It is also noted that a squeeze film dampener and roller bearing system is illustrated, however, any number of lubrication/cooling systems may be integrated with the above bearing lubrication system 72 without departing from the scope of the invention.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: an electrified turbocharger comprising: an electric motor surrounding a portion of a shaft constructed and arranged to selectively drive the shaft, wherein the electric motor further comprises a stator comprising a lamination stack; a housing surrounding the electric motor, wherein the housing includes a plurality of channels constructed and arranged to lubricate a first bearing; and wherein the lamination stack is constructed and arranged to include at least one conduit to pass oil through the electric motor to a second bearing.

Variation 2 may include a product as set forth in Variation 1 wherein the lamination stack further comprises a plurality of teeth, and wherein the at least one conduit comprises a first tube and a second tube which each extend through openings between the plurality of teeth, and where the first tube and the second tube are constructed and arranged to feed oil through the electric motor to the second bearing.

Variation 3 may include a product as set forth in Variation 2 wherein the first tube and the second tube are constructed and arranged to fit within the openings between the plurality of teeth so that the stator is locked from rotation.

Variation 4 may include a product as set forth in any of Variations 1-3 further comprising a turbocharger turbine wheel and wherein the shaft is operatively connected to the turbocharger turbine wheel, and wherein the turbocharger turbine wheel drives the shaft.

Variation 5 may include a product as set forth in any of Variations 1-4 further comprising a turbocharger compressor wheel and wherein the shaft is operatively connected to the turbocharger compressor wheel to drive the turbocharger compressor wheel.

Variation 6 may include a product as set forth in any of Variations 2-5 further comprising a first housing portion constructed and arranged to house the first bearing and having a first plurality of oil channels; a second housing portion constructed and arranged to house the second bearing and having a second plurality of oil channels; an oil feed tube attached to the first housing portion, and wherein the first plurality of oil channels and the second plurality of oil channels are connected to the first oil tube and the second oil tube.

Variation 7 may include a product as set forth in Variation 6 wherein the first housing portion further includes a threaded bore defined by an inner threaded surface and wherein the oil feed tube is at least partially threaded and is threaded into the threaded bore.

Variation 8 may include a product as set forth in Variation 7 wherein the oil feed tube includes a pilot feature to prevent cross threading between the threaded bore and the oil feed tube.

Variation 9 may include a product as set forth in any of Variations 2-8 wherein the first tube and the second tube are a first length and the stator is a second length, and wherein the first length of the first tube and the second tube is greater than the second length of the stator.

Variation 10 may include a product as set forth in any of Variations 2-9 wherein the first tube and the second tube each include a first end and a second end, and wherein a nut is attached to the first ends to provide a preload for clamping of the stator in a predetermined location.

Variation 11 may include a product as set forth in Variation 10 wherein the second ends of the first tube and the second tube bottom out in the second housing portion.

Variation 12 may include a product as set forth in Variation 10 wherein a first housing portion is slid over the nuts to form a seal.

Variation 13 may include a product as set forth in Variation 1 wherein the at least one conduit comprises at least one through-hole in the lamination stack defined by an inner cylindrical surface.

Variation 14 may include a product as set forth in Variation 13 wherein the at least one conduit extends through a tooth of the lamination stack.

Variation 15 may include a method for a bearing lubrication system for an electric turbocharger comprising: providing a stator with a first oil conduit and a second oil conduit extending through the stator; feeding oil to one end of a turbocharger housing so that oil is supplied to a first bearing and through the first oil conduit and the second oil conduit so that oil is supplied to a second bearing.

Variation 16 may include a method as set forth in Variation 15 wherein the first oil conduit is a first oil tube and the second oil conduit is a second oil tube, and wherein the first oil tube extends through a first opening between a plurality of teeth on the stator and the second oil tube extends through a second opening between the plurality of teeth on the stator.

Variation 17 may include a method as set forth in Variation 15 wherein the at least one conduit is at least one through-hole in the stator defined by an inner cylindrical surface.

Variation 18 may include a method as set forth in Variation 17 wherein the at least one conduit extends through a tooth of the stator.

The above description of select variations within the scope of the invention is merely illustrative in nature and, thus, variations or variants thereof are not to be regarded as a departure from the spirit and scope of the invention.

What is claimed is:

1. A product comprising:
an electrified turbocharger comprising:
a turbocharger shaft;
an electric motor surrounding a portion of the turbocharger shaft constructed and arranged to selectively drive the turbocharger shaft, wherein the electric motor further comprises a stator comprising a lamination stack;
a housing surrounding the electric motor, wherein the housing includes plurality of channels constructed and arranged to lubricate a first turbocharger shaft bearing; and
wherein the lamination stack is constructed and arranged to include at least one conduit to pass oil through the electric motor to a second turbocharger shaft bearing.

2. The product of claim 1 wherein the lamination stack further comprises a plurality of teeth, and wherein the at least one conduit comprises a first tube and a second tube which each extend respectively through a first opening between the plurality of teeth and a second opening between the plurality of teeth, and where the first tube and the second tube are constructed and arranged to feed oil through the electric motor to the second bearing.

3. The product of claim 2 wherein the first tube and the second tube are a first length and the stator is a second length, and wherein the first length of the first tube and the second tube is greater than the second length of the stator.

4. The product of claim 2 wherein the first tube and the second tube each include a first end and a second end, and wherein a nut is attached to the first ends to provide a preload for clamping of the stator in a predetermined location.

5. The product of claim 4 wherein the second ends of the first tube and the second tube bottom out in the second housing portion.

6. The product of claim 4 wherein a first housing portion is slid over the nuts to form a seal.

7. The product of claim 1 wherein the lamination stack further comprises a plurality of teeth, and wherein the at least one conduit comprises a first tube and a second tube which each extend respectively through a first opening between the plurality of teeth and a second opening between the plurality of teeth, and where the first tube and the second tube are constructed and arranged to fit within the first opening and second opening so that the stator is locked from rotation.

8. The product of claim 1 further comprising a turbocharger turbine wheel and wherein the shaft is operatively connected to the turbocharger turbine wheel, and wherein the turbocharger turbine wheel drives the shaft.

9. The product of claim 1 further comprising a turbocharger compressor wheel and wherein the shaft is operatively connected to the turbocharger compressor wheel to drive the turbocharger compressor wheel.

10. The product of claim 1 further comprising a first housing portion constructed and arranged to house the first bearing and having a first plurality of oil channels; a second housing portion constructed and arranged to house the second bearing and having a second plurality of oil channels; an oil feed tube attached to the first housing portion, and wherein the first plurality of oil channels and the second plurality of oil channels are connected to the first oil tube and the second oil tube.

11. The product of claim 10 wherein the first housing portion further includes a threaded bore defined by an inner threaded surface and wherein the oil feed tube is at least partially threaded and is threaded into the threaded bore.

12. The product of claim 11 wherein the oil feed tube includes a pilot feature to prevent cross threading between the threaded bore and the oil feed tube.

13. The product of claim 1 wherein the at least one conduit comprises at least one through-hole in the lamination stack defined by an inner cylindrical surface.

14. The product of claim 13 wherein the at least one conduit extends through a tooth of the lamination stack.

15. A method for a bearing lubrication system for an electric turbocharger comprising:
providing a turbocharger shaft;
providing an electric motor comprising a stator and a housing;

providing the stator with a first oil conduit and a second oil conduit extending through the stator; feeding oil to one end of a turbocharger housing so that oil is supplied to a first bearing and through the first oil conduit and the second oil conduit so that oil is supplied to a second bearing, wherein the turbocharger shaft extends through the stator and the stator housing.

16. The method of claim 15 wherein the first oil conduit is a first oil tube and the second oil conduit is a second oil tube, and wherein the first oil tube extends through a first opening between a plurality of teeth on the stator and the second oil tube extends through a second opening between the plurality of teeth on the stator.

17. The method of claim 15 wherein the at least one conduit is at least one through-hole in the stator defined by an inner cylindrical surface.

18. The method of claim 17 wherein the at least one conduit extends through a tooth of the stator.

* * * * *